United States Patent
Marques et al.

(10) Patent No.: US 7,012,958 B2
(45) Date of Patent: *Mar. 14, 2006

(54) PARTITION CODING METHOD AND DEVICE

(75) Inventors: Ferran Marques, Barcelona (ES);
Cristina Gomila, Menorca (ES);
Antoni Gasull, Badalona (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 51 days.

This patent is subject to a terminal disclaimer.

(21) Appl. No.: 10/434,802

(22) Filed: May 9, 2003

(65) Prior Publication Data

US 2003/0202584 A1    Oct. 30, 2003

Related U.S. Application Data

(63) Continuation of application No. 09/406,651, filed on Sep. 27, 1999, now Pat. No. 6,594,310.

(30) Foreign Application Priority Data

Sep. 29, 1998  (EP)  ................................. 98402395
Feb. 23, 1999  (EP)  ................................. 99400436

(51) Int. Cl.
*H04B 1/66*      (2006.01)

(52) U.S. Cl. ........................... 375/240.01; 375/240.08; 375/240.24; 375/240.12; 375/240.16; 375/240.09; 382/242; 382/238; 382/243; 382/236; 348/699

(58) Field of Classification Search ........... 375/240.01, 375/240.24, 240.08, 240.09, 240.16, 240.12; 348/699; 382/242, 243, 238, 236
See application file for complete search history.

(56) References Cited

U.S. PATENT DOCUMENTS

| 5,757,971 | A  |   | 5/1998  | Kim |
| 5,978,510 | A  |   | 11/1999 | Chung et al. |
| 5,995,668 | A  | * | 11/1999 | Corset et al. ............... 382/233 |
| 6,594,310 | B1 | * | 7/2003  | Marques et al. ............ 375/240 |

FOREIGN PATENT DOCUMENTS

WO    WO9709828    3/1997

OTHER PUBLICATIONS

Nunes et al, "Multiple Grid Chain Coding of Binary Shapes", Oct. 1997, Proceedings of Int'l. Conf. on Image Processing, vol. III, pp. 114-117.*

"Multiple Grid Chain Coding of Binary Shapes", P. Nunes et al, Proceedings of Int'l Conf. on Image Processing, Oct. 26-29, 1997, vol. III, pp. 114-117.

* cited by examiner

*Primary Examiner*—Shawn S. An

(57) ABSTRACT

The invention relates to a method of coding segmented pictures, or partitions, divided into homogeneous regions. Said method, called intra-mode coding process, comprises, for each successive partition, the steps of translating the picture of the labels associated to the regions into a description in terms of a contour element chain in which the elements are defined by means of their movements through successive basic cells, tracking inside each successive cell each contour from its initial contour point, previously extracted, to its end by storing chain symbols corresponding both to input, internal and output contour elements of said cell and to priorities between possible multiple outputs elements, and repeating these steps up to the end of each successive contour segment of the concerned partition. The information corresponding in each cell to the initial point of each contour segment and to the associated chain of movements between that initial point and the initial one of the following cell is finally coded.

13 Claims, 9 Drawing Sheets

MM 153

MM 356

PARTITION CODING METHOD AND DEVICE

This application is a continuation of Ser. No. 09/406,651, filed Sep. 27, 1999, now U.S. Pat. No. 6,594,310.

FIELD OF THE INVENTION

The present invention relates to a method of coding segmented pictures, or partitions, divided into homogeneous regions to which specific labels are respectively associated, and to a corresponding device. This invention has mainly applications in relation with the MPEG-4 standard, for the implementation of MPEG-4 encoders.

BACKGROUND OF THE INVENTION

Conventional methods of coding segmented pictures—or partitions—are usually considered as rather expensive in terms of amount of bits, e.g. an average value of 1,3 bit per pixel of contour with the so-called chain code technique. Lossy shape coding techniques have therefore been proposed, but losses in shape information often result in an unacceptable degradation of the subjective quality of the image displayed on the basis of the decoded picture.

Quasi-lossless shape coding techniques (and therefore, by extension, quasi-lossless partition coding techniques) have then been proposed. For instance, the so-called multiple grid chain code approach (MGCC), described in the document "Multiple grid chain coding of binary shapes", by P. Nunes, F. Ferreira and F. Marqués, Proceedings of International Conference on Image Processing, vol. III, pp. 114–117, Oct. 26–29, 1997, Santa Barbara, Calif., USA, allows to efficiently encode binary shape information of video objects in the context of object-based video coding schemes. Said approach also allows general partition coding, while introducing very few and controlled losses, only restricted to isolated picture elements (pixels) belonging to the boundaries of the regions of each partition.

This conventional MGCC approach relies on a contour representation of the partition. As shown in FIG. 1 that depicts a small general partition of size N×M with for example three regions to which respective labels (in the present case, represented by the grey, black and white circles) are associated, any pixel has four different contour elements associated. FIG. 2 shows the same partition as depicted in FIG. 1, but with the indication of the specific contour elements that define the changes between every pair of neighbour pixels that do not belong to the same region. FIG. 3 shows in a corresponding matrix of (2N+1)×(2M+1) sites the implementation of both grids: that associated to the pixel sites (=the circles) and that related to the contour sites (=the segments of lines). The contour elements that are situated between pixels of different labels are considered as active.

On turn, an element of the contour grid may have up to six active neighbours, as illustrated in FIG. 4, and, due to that, the contour grid is usually referred to as hexagonal grid. A way to code the partition information in the contour grid is to select an initial point in the grid and to track the active sites up to the end of the corresponding contour. This method performs a lossless coding of the partition information, by encoding the movement from a current contour element to the following neighbour contour element (only three possible movements: straight, right, left).

Another contour tracking method is to move through the contour using larger steps, only contour elements linked by such larger steps being encoded: in the above-cited document, the described MGCC technique uses basic cells of 3×3 pixels, as the one illustrated in FIG. 5, where all contour and pixel sites in the cell are shown. For compression efficiency reasons, two types of cells are then used: counter-clockwise, as in FIG. 6, or clockwise, as in FIG. 7. The way to index the different contour elements in each type of cell is presented: the initial contour site is denoted by the symbol 0 and the other ones by the symbols 1 to 7, the symbol 1 being assigned to the site which is on the same side of the cell as the symbol 0. Consequently, to characterize a cell, three parameters are necessary: its initial contour site, its type (clockwise or counter-clockwise), and its orientation (=east or west for a cell with an horizontal initial contour element, north or south for a vertical one). The coding algorithm selects between each of these two types of cell in order to maximize the number of contour elements coded per cell.

The MGCC technique uses said indexing as well as its possible rotations. Starting by the input element of the cell indexed with a 0 in FIG. 6, any output element from the set (1, 2, . . . , 6, 7) can be reached, but the way to go through the cell is not univocally defined by the output element: as shown in the example of FIGS. 8 and 9, a movement (in this case, from 0 to 4) may indeed correspond to two different contour configurations. The contour elements inside the cell (8, 9, 10, 11), not coded, introduce ambiguity in the coding process, two different sets of contour sites (0, 8, 9, 4) or (0, 11, 10, 4) being possible. This ambiguity introduces coding losses. Nevertheless the only possible error is the erroneous labeling of the central pixel of the cell, i.e. only of an isolated boundary pixel.

In a contour tracking process, several cells are then linked up in order to complete the contour. To link two cells, the output contour site of the current cell becomes the input contour site of the following cell, as FIG. 10 shows. When coding with the MGCC approach the boundary of a single region, the bitstream thus generated will therefore contain: (a) the position of the initial contour site, and (b) the chain of symbols representing the movements performed in order to track the contour.

In the contour tracking process, it is needed to change progressively the position of the basic cell through the grid. The proposed technique is described for instance in the article "Encoding of line drawings with a multiple grid chain code", by T. Minami and K. Shinohara, IEEE Transactions on Pattern Analysis and Machine Intelligence, vol. PAMI-8, n° 2, March 1986, pp. 269–276. The basic principle is explained with reference to FIGS. 11 to 15.

As indicated in FIG. 11 giving an example of coding with a fixed grid, a contour segment has been here coded by means of the symbol 4 in the first cell (a counter-clockwise one). If cells of the same grid are used, the symbol 7 (FIG. 12) is used in the second cell for tracking the contour (the symbol 0 being always the new initial—or input—site), and the symbol 2 (FIG. 13) in the third one, these second and third cells being in that case clockwise ones. Three cells are therefore needed to track the contour from the first initial site. On the contrary, only two are needed if the grid (i.e., in fact, the position of the center of the cell) is changed: as shown in FIGS. 14 and 15 that illustrate a modification of the grid with respect to the example of FIGS. 11 to 13, only a second cell is now indeed needed to go to the same output site.

This solution of FIGS. 14 and 15 leads to a more compact representation of the contour. However, three different classes of grids are then necessary to define the shift of each grid with respect to the origin of the corresponding cell (called G0) before said shift. These three classes G1, G2, G3 are defined, as indicated in the following classification table, by the position (x, y) of the pixel which is the origin of each type of cell, with respect to the pixel which is the origin of said corresponding cell:

TABLE 1

| GRID | SHIFT WITH RESPECT TO THE ORIGIN OF THE REFERENCE GRID G0: |
|---|---|
| G0 | (0, 0) |
| G1 | (1, 0) |
| G2 | (0, 1) |
| G3 | (1, 1) |

In the example of FIG. 10, a cell of the class G2 was used (with respect to the corresponding current cell G0); in another example illustrated in FIG. 16, a cell of the class G1 is used (with respect to the corresponding current cell G0).

However, the MGCC approach previously described can only be used to code binary partitions. In case of general segmented pictures, the partitions contain regions that share contours, and said approach is no longer appropriate.

SUMMARY OF THE INVENTION

It is therefore an object of the invention to propose an improved method also using the type of contour grid previously defined, but leading to a more general and more efficient coding of the contour segments of the regions of a picture.

To this end, the invention relates to a method such as presented in the preamble of the description and which is moreover characterized in that it comprises, for each successive partition, the steps of:

(a) translating the picture of labels into a description in terms of a contour element chain in which the elements are defined by means of their movements through successive basic cells, between an input point and an output point of said cells;

(b) tracking inside each successive cell each contour from its initial contour point, previously extracted, to its end by storing chain symbols corresponding both to input, internal and output contour elements of said cell and to priorities between possible multiple outputs elements;

(c) repeating these steps up to the end of each successive contour segment of the concerned partition;

(d) coding the information corresponding in each cell to the initial point of each contour segment and to the associated chain of movements between that initial point and the initial one of the following cell;

said successive steps defining a so-called intra-mode coding process of image partitions.

In this method, the concept of triple point at the intersection of two different contours is introduced, which allows to locate the initial point (or starting contour site) of a new contour (not yet coded) with respect to a previous one, and, by introducing for these triple points a new symbol in the coding chain, a more efficient coding is obtained: while the MGCC approach tracks the contour chaining cells, triple points will be replaced, in the present case, by the concept of cells with multiple outputs.

With respect to this basic method, two main extensions are possible, the first one to the case of scalable partition sequence coding and the second one to the case of inter-mode partition sequence coding.

In the first one of said improved embodiments of the invention, the method is moreover characterized in that each current partition is divided into a basic layer and at least an enhancement one, said intra-mode coding process being then successively applied to the basic layer without any change and to the enhancement layer with the following modifications:

in the operation of extraction of the initial contour points, the initial points of contour segments are associated to contour points from the basic layer;

in the tracking step, all the points belonging to the basic layer are withdrawn;

in the repeating step, the closing of a contour before processing the following one is associated to contour points of the basic and enhancement layers.

In the second one of said improved embodiments, said coding method is characterized in that each current partition is divided into a first part of the partition, including some regions that need to be coded in intra-mode, and a second part of the partition, corresponding to the other regions to be motion compensated, said intra-mode coding process being then applied to said first part playing the role of the basic layer and an associated inter-mode coding process being correspondingly applied to said second part playing the role of the enhancement layer.

BRIEF DESCRIPTION OF THE DRAWINGS

The particularities and advantages of the invention will now be explained in a more detailed manner, with reference to the accompanying drawings in which.

DETAILED DESCRIPTION OF THE INVENTION

Figure 1:
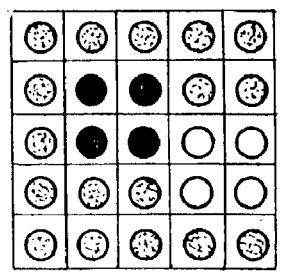
FIG. 1 shows an example of partition of size M×N (in this case, with M=N=5), and FIG. 2 the same partition with the contour elements that define the boundaries between the different regions.
Figure 2:
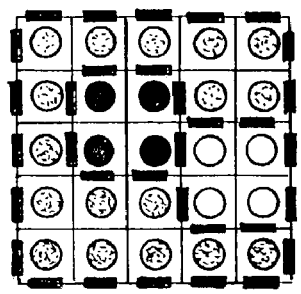
Figure 3:
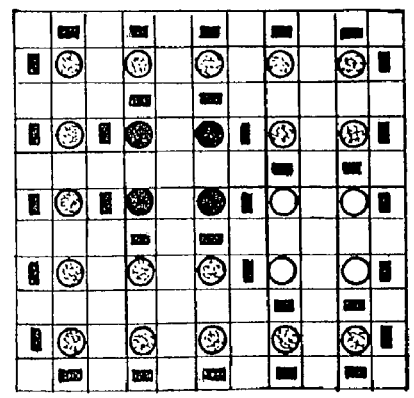
FIG. 3 associates both grids (the one associated to the pixel sites and the one associated to the contour sites)
Figure 4:
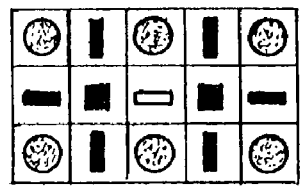
FIG. 4 is a representation of the six active neighbours of a contour element of the contour grid.
Figure 5:
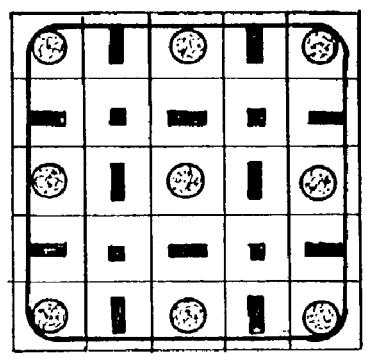
FIG. 5 shows a basic cell of 3×3 pixels, used in the MGCC technique.
Figure 10:
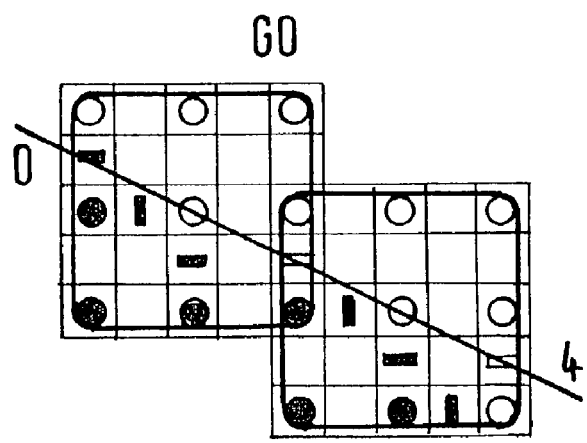
FIG. 10, FIGS. 11 to 13, FIGS. 14 to 15, and FIG. 16 illustrate two distinct solutions to link cells for a contour tracking process.
Figure 6:
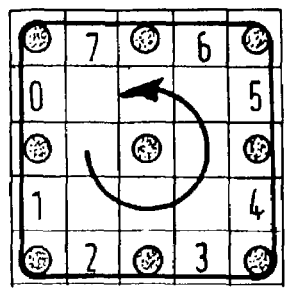
FIGS. 6 and 7 illustrate the way to index the contour elements for a counter-clockwise cell and a clockwise one.
Figure 7:
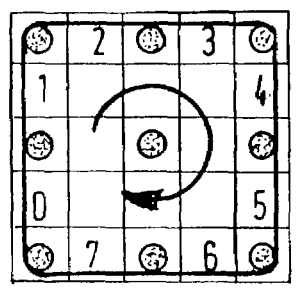
Figure 8:
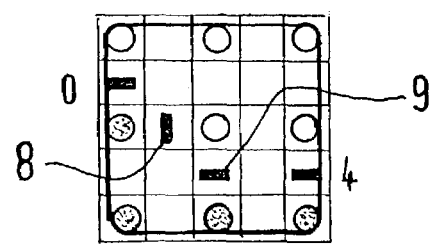
FIGS. 8 and 9 show, for the same input and output elements of a cell, two different contour configurations in said cell.
Figure 9:
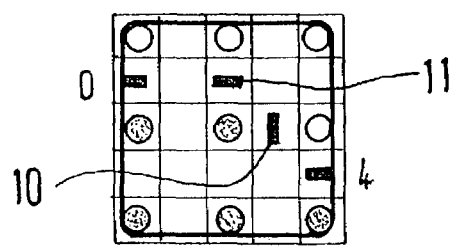
Figure 11:
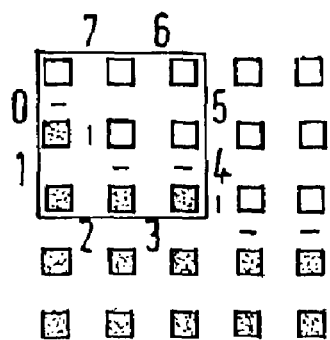
Figure 12:
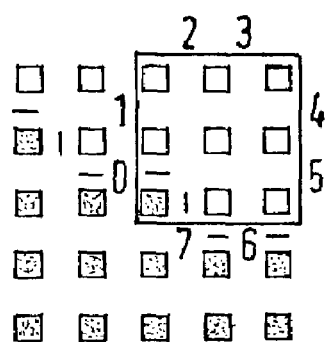
Figure 13:
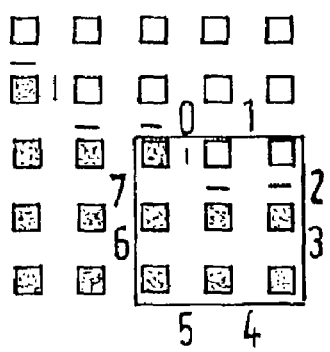
Figure 14:
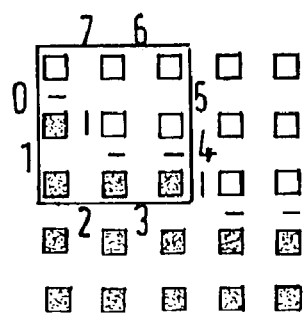
Figure 15:
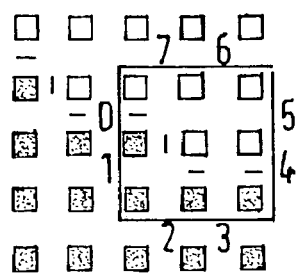
Figure 16:
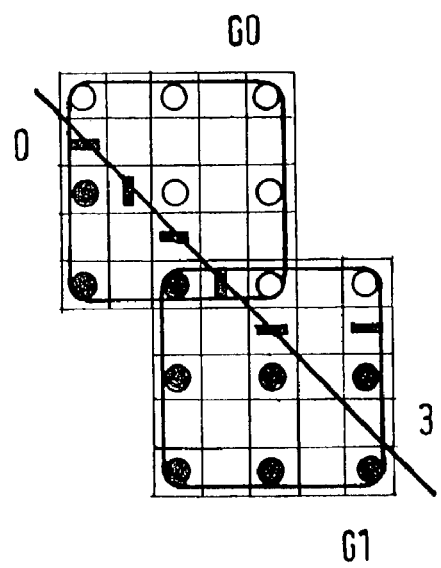
Figure 17:
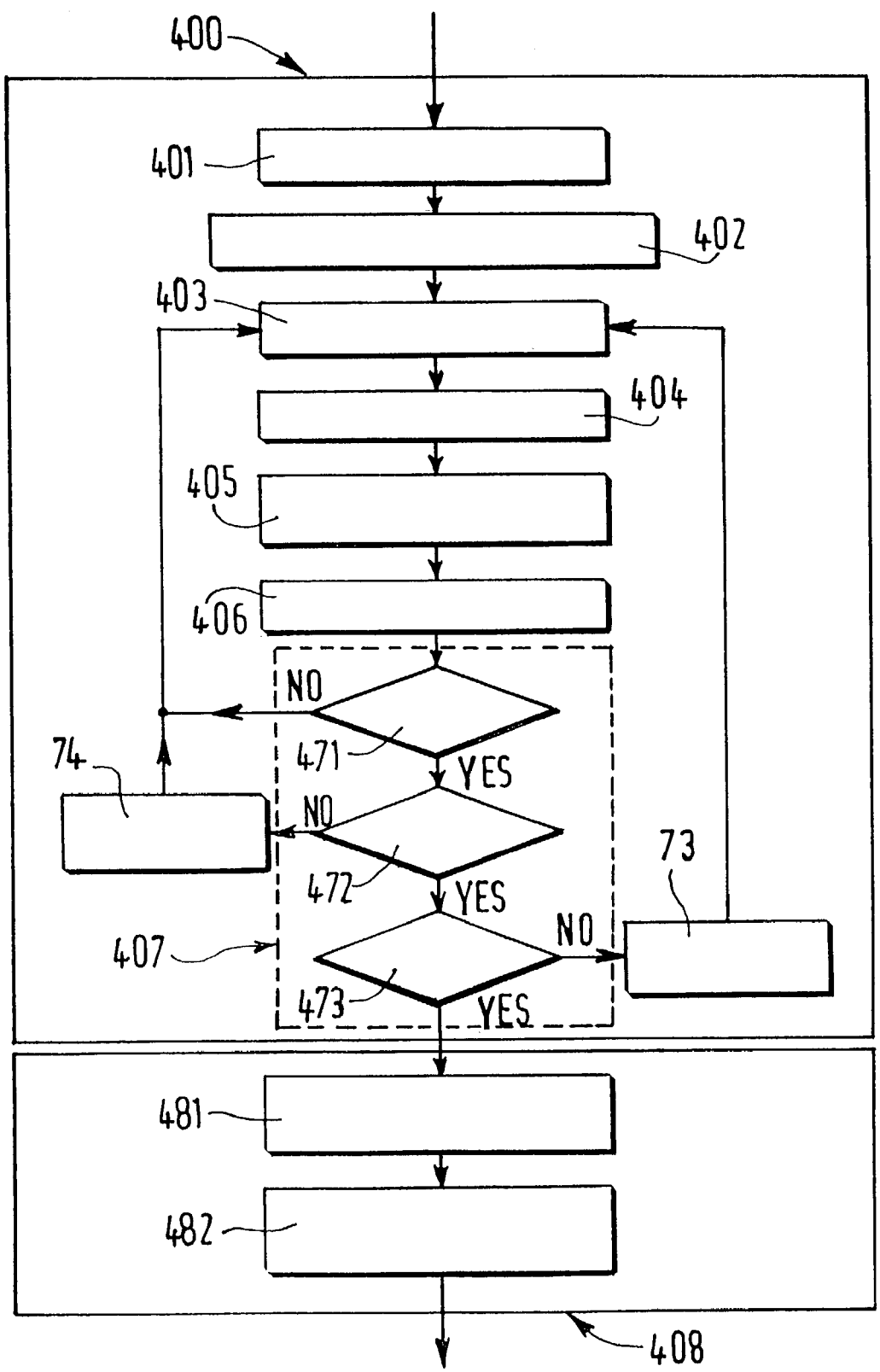
FIG. 17 is a flowchart illustrating a complete scheme of the MGCC encoding method according to the invention.

The flowchart of FIG. 17 corresponds to a basic scheme of an MGCC intra-mode encoding method according to the invention. This MGCC encoding process is applied on contour images defined on the type of contour grid described in relation with FIGS. 4 and 5. A partition, usually described in term of labels, must therefore be translated into a description of contour elements in the hexagonal grid. The main steps of the proposed method, carried out in the block designated by the reference 400 in FIG. 17, will be the following: generation of the contour image, extraction of the initial points from the picture, cell characterization, contour tracking, determination of the priority in the contour tracking, management of the multiple points, end of process, and extraction of the next initial point, these steps being followed by the final coding steps.

The first step 401 of the proposed method is provided for generating the contour pictures that will be later coded. The original partitions, described in terms of pictures of labels, must therefore be translated into a description in terms of contour elements defined with the above-described hexagonal grid.

The second step 402 is provided for extracting all the initial contour points from the picture. It will be noted here that the picture will be scanned in a raster manner (from top to down and from left to right). An MGCC approach codes a picture contour addressing every region (or cluster of regions, for instance when several interior regions, that have no contact contour point with other regions and therefore do not yield any triple point, are considered together) separately. The first contour to be considered is then always the contour of the frame of the picture: in fact, since the receiver will already know the shape of such a picture frame, the only information that has to be coded from this frame contour is the positions of the initial points that will define the starting of new contour segments. Practically, contour points contacting this frame (in fact, the characteristics of the cell having as input contour these specific contour points) are stored in a buffer (a FIFO queue) and then called "PENDING" points (for specific treatment as it will be seen later in the description).

The third step 403 is a cell characterization one. Indeed, once the initial point of a contour has been selected, the cell that it defines has to be characterized. For all initial points, the class of grid is set to GO (see the previous classification table). In the case of an initial contour point contacting the frame contour, the side of the frame where said point is located fixes the orientation and type of the cell as shown in this table (where c and cc respectively mean clockwise and counter-clockwise):

TABLE 2

| INITIAL POINT | ORIENTATION | CELL TYPE |
|---|---|---|
| Top side | S (=south) | c |
| Right side | W (=west) | c |
| Bottom side | N (=north) | c |
| Left side | E (=east) | c |
| Interior | E (=east) | cc |

As can be seen, in the case of an initial point of an interior cluster of regions, due to the scanning adopted, the type is set to "counter-clockwise" and the orientation to "east". In the case of a cell whose input contour site is neither a contour point contacting the frame nor the initial point of a cluster, its characterization depends on the prediction based on the movement performed in the previous cell. This way, the input contour of the current cell is the output contour of the previous one, and the assignment of orientation and cell type follows the rules indicated in Table 3, in which the second row (N, E, S, W, c, cc) represents the data of the current cell:

TABLE 3

|  | CURRENT CELL ORIENTATION | | | | CURRENT CELL TYPE | |
|---|---|---|---|---|---|---|
| OUTPUT | N | E | S | W | c | cc |
| 1 | S | W | N | E | c | cc |
| 2 | W | S | E | N | cc | c |
| 3 | W | S | E | N | cc | c |
| 4 | N | E | S | W | c | cc |
| 5 | N | E | S | W | c | cc |
| 6 | E | N | W | S | c | cc |
| 7 | E | N | W | S | c | cc |

Figure 18:
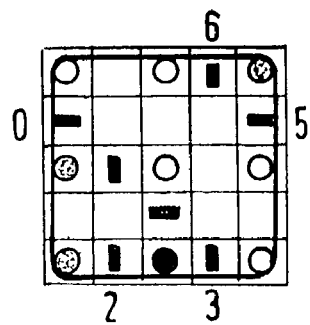
FIGS. 18 and 19 illustrate, in said encoding method, the step of contour tracking inside a cell of the grid.
Figure 19:
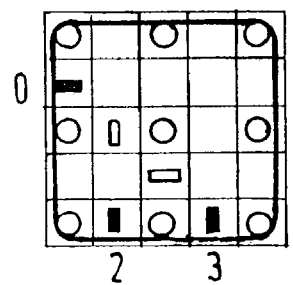

Once a cell has been characterized, the contour information in the cell has to be stored in the chain of symbols. A contour tracking step 404 is then provided. In said step, only those contour elements that are linked to the initial contour of the cell are taken into account, the other ones inside the cell (not linked to said initial contour) being withdrawn and analyzed later during the tracking process. Starting by the input contour, the tracking is carried out with the following priority: straight—right—left, so that a list of output contours linked with the input contour is created. During this tracking operation, input and output contour points are marked as INOUT, and the other contour points inside the cell, necessary to link the input and output contours, are marked as INTERNAL. This step 404 of contour tracking inside the cell is illustrated in FIGS. 18 and 19. An original cell is presented in FIG. 18: since the outputs 5 and 6 are not connected to the input, they are withdrawn in FIG. 19. The contours which are neither input nor output sites are marked as INTERNAL.

The set of contours that have been detected has then to be stored in the chain of symbols. If only one output contour is found, the movement linking the input to the output contour is stored; if multiple output points are detected, the cell will require more than one symbol to code the contour configuration. A priority determination step 405 is then provided.

In that step, the sub-chain describing the contour information in the cell starts with symbol M, corresponding to "multiple output", for each additional output. Thus, if the sub-chain of a cell starts with n symbols M, the following (n+1) symbols describe its different active outputs. The set of output contours is stored in the chain in a specific order (which will be useful later, in the decoder, in order to solve the uncertainty of the central pixel of the cell). The symbol related to the output contour with the highest priority is introduced in the chain just after the set of symbols M and will be the input contour for the next cell (if the contour is not closed). The highest priority symbol is fixed by the length of the contour segment that links the input contour with each one of the output contours: it is the symbol corresponding to the longest path, which has the advantage of maximizing the number of contour elements coded per cell. If two contour segments have the same length, the ambiguity is solved by taking into account the tracking priority indicated previously: straight—right—left. The other output contours are not ordered based on the length criterion (such an ordering would solve very few cases of uncertainly while increasing the complexity of the decoder), but on the basis of the tracking priority (straight—right—left).

Figure 20:
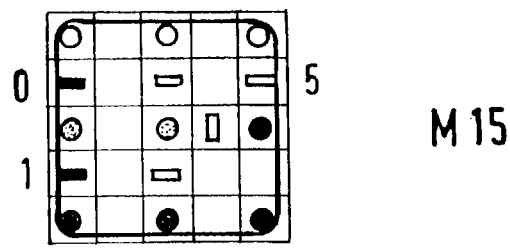
FIGS. 20 to 22 illustrate how to order two output contours during a priority determination step.
Figure 21:
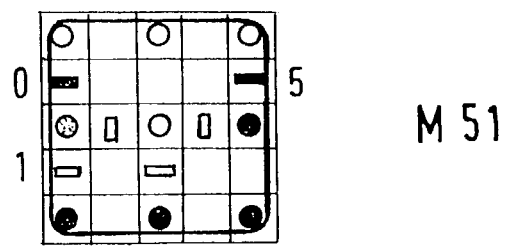
Figure 22:
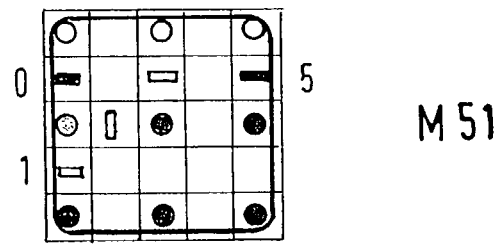

Examples may be given for a better understanding. The ordering of two output contours is shown in FIGS. 20 to 22. In FIG. 20, the longest path leads to the output 1, and the symbols in the chain will thus be M15. In FIG. 21, the longest path leads to 5: the symbols will be M51. However this set of symbols does not result in a unique cell configuration since the third example of FIG. 22 leads to the same representation M51. In this last case, the paths leading to both outputs (5 and 1) have the same length: relying then on the tracking priority, the resulting chain is therefore M51.

Figure 23:
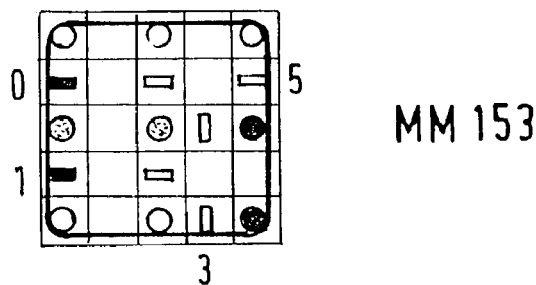
FIGS. 23 and 24 give two examples of cells with multiple outputs.
Figure 24:
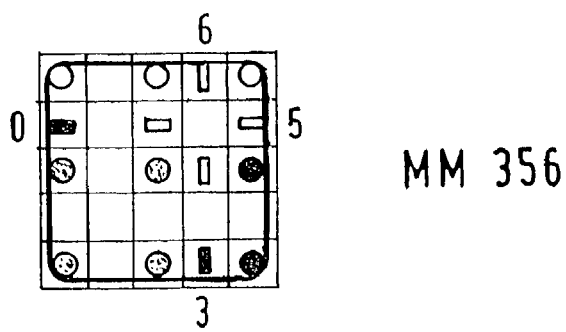

For the case of a sub-chain with n symbols M, two examples of cells with multiple outputs are given in FIGS. 23 and 24. The example of FIG. 23 corresponds to a cell with two triple points. The chain of symbols describing the contour information of this cell is MM 153 (it must be noted that, although the path leading to the output 3 is longer than that leading to the output 5, said symbol 5 appears first in the sub-chain: it is due to the ordering of the non-priority symbols, which is based on the tracking priority rather than on the length criterion). In the example of FIG. 24, where a quadruple point is present, the chain of symbols describing this cell contour information is MM 356 (the path leading to 3 is the longest one, and the tracking priority gives the priority to 5 with respect to 6).

When a multiple output is observed in a cell, a specific symbol is therefore included in the sub-chain, as it has just been described. This operation is followed by a multiple point management step 406. During said step, the output with less priority (unless it closes the contour segment) is stored in a buffer of pending points (a FIFO queue), and all output points that are stored in that manner in the buffer receive the mark "PENDING".

The reason of such a marking operation is that not all the points that are stored in the buffer will be needed in the future to refer to a new contour segment. During the tracking process, a new cell may indeed contain a contour point previously marked as "PENDING". In this case, the segment that was associated to this "PENDING" contour point has been already completed and the corresponding multiple point has to be removed from the chain (when erasing the effect of a multiple point from the chain, two symbols have to be removed: the symbol M of multiple point is first cancelled, and the movement that linked the input of the cell with the multiple output associated is then removed, which leads for instance to have only the single symbol 3 in the sub-chain if the information in a cell was previously encoded with the sub-chain M35 and a new cell covers the second output, related to the movement towards 5).

In addition, the concerned output contour has to be removed either from the buffer of possible initial points, if it contacts the frame, or from the buffer of "PENDING" points. Finally, the mark of the former output point—that associated to the movement towards 5—has to be updated. If the new cell has this contour point as an output, its mark moves from "PENDING" to "INOUT". If the new cell has this contour point as an interior contour point, its mark moves from "PENDING" to "INTERNAL".

The last step of the tracking process, designated in FIG. 17 by the reference 407, is provided for ending a contour (test 471), a cluster (test 472), or the partition (test 473). The end of a contour segment relies on the contour elements previously marked as "INOUT" during the tracking process. When an output contour in a cell coincides with a contour marked as "INOUT", this branch of the contour segment is closed. If the output contour is that of highest priority, the end of the contour segment is reached (at the decoder side, this will allow to close contours on known contour sites and prevent possible splitting of regions). Moreover, if the output contour is marked as "INTERNAL" or "PENDING" but any of the following contour sites that can be reached from it is an "INOUT" one, the contour (or the branch) is ended as well.

When a contour segment ends, one has to check whether the cluster of regions has been finished. The buffer of "PENDING" points is checked first, in order to see whether there are any further "PENDING" points in it or all of them have been already extracted. If there are no "PENDING" points left, the buffer of possible initial points (initial points contracting the frame) is checked (the reason for extracting first those contours from the buffer of "PENDING" points is for coding efficiency purpose). If both buffers are empty, the cluster is finished and a new one (if any) is similarly considered.

As previously said, the picture is scanned in a raster manner (from top to down and from left to right), and the first non-coded active contour is taken as the initial point for a new cluster of regions. If there are no more non-coded active contour, the whole partition has been coded.

This last step of the tracking process is therefore sub-divided into the three sub-steps 471 to 473. As long as a contour is not ended (test 471), a backward connection allows to repeat the steps 403, 404, 405, 406. As soon as a contour is ended, the test "end of cluster" is undertaken (test sub-step 472). As long as the cluster of regions is not finished, the following procedure is carried out. The buffer of "PENDING" points is checked (operation 74: recuperation of a stored pending point), in order to see whether there are further "PENDING" points in it. If all of them have been already extracted, the buffer of possible initial points contacting the frame is checked (the reason for extracting first these contours from the buffer of "PENDING" points is for coding efficiency purposes). If both buffers are empty, the cluster is finished, and a new cluster of regions is considered (operation 73: extraction of the next initial point). When there are no more non-coded active contours (test 473), it means that the whole partition has been processed.

The last step of the partition coding method is an entropy coding step 408, including a first coding sub-step 481 for coding the information of initial points and a second coding sub-step 482 for coding the chain of movements.

For the implementation of the sub-step 481, it is necessary to distinguish between the external initial points and the internal ones. All the initial points contacting the frame (i.e. referring to the first cluster) are coded together as a header of the first chain of movements. For each initial point contacting the frame, the position of the point of the frame previous to said initial point is coded. These initial points are indexed thanks to two different word lengths: P bits are used for the horizontal dimension of the picture (top and bottom sides) and Q bits for the vertical one (left and right sides), with for instance $P=\log_2[\dim\_x]$ and $Q=\log_2[\dim\_y]$. If there are finally no remaining points to be coded on one side of the frame, a specific word is used to indicate this situation (for instance, $P_T$ or $Q_T$). When the last initial point contracting the frame has been coded, another specific word (for instance, $P_o$ or $Q_o$) is used to indicate the start of the chain of movements. If there are no initial points on the frame, the word $P_o$ precedes a code ("intern_ip") given to the first internal initial point. The way to code these various situations, corresponding to different numbers of initial points on the four sides of the frame is indicated in the following table (bot=bottom)

TABLE 4

| P-top | P-right | P-bot | P-left | Header of initial points |
|---|---|---|---|---|
| o | o | o | o | $P_0$ intern_ip |
| m | o | o | o | $P_1 \ldots P_m P_0$ |
| m | n | o | o | $P_1 \ldots P_m P_T Q_1 \ldots Q_n Q_0$ |
| m | n | p | o | $P_1 \ldots P_m P_T Q_1 \ldots$ $Q_n Q_T P_1 \ldots P_p P_0$ |
| m | n | p | q | $P_1 \ldots P_m P_T Q_1 \ldots$ $Q_n Q_T P_1 \ldots P_p P_T Q_1 \ldots Q_q Q_0$ |

Internal initial points are similarly indexed. As they have been obtained by scanning the image from top to bottom, an internal initial point always corresponds to an horizontal contour site. Only the horizontal contours are therefore indexed.

For the implementation of the sub-step 482, although the optimal solution implies the analysis of the probabilities for each coded partition, good results have been obtained with a simpler, non-optimal solution using a generic set of tables according to which partitions are classified depending on their number of regions (in order to deal with homogeneous symbol probability). Three groups of analysis are proposed depending on the density (low, intermediate, high), and Huffman tables respectively associated to these groups are presented:

LOW

| Symbol | Prob. | Huffman |
|---|---|---|
| 5 | 0.3896 | 1 |
| 4 | 0.2225 | 000 |
| 3 | 0.1244 | 010 |
| 2 | 0.1099 | 011 |
| 7 | 0.0803 | 0010 |
| 6 | 0.0482 | 00110 |
| 1 | 0.0184 | 001110 |
| M | 0.0064 | 001111 |

INTERMEDIATE

| Symbol | Prob. | Huffman |
|---|---|---|
| 5 | 0.4073 | 1 |
| 4 | 0.1463 | 001 |
| 2 | 0.1181 | 011 |
| 3 | 0.1083 | 0000 |
| 7 | 0.0783 | 0100 |
| 6 | 0.0561 | 0101 |
| M | 0.0544 | 00010 |
| 1 | 0.0308 | 00011 |

HIGH

| Symbol | Prob. | Huffman |
|---|---|---|
| 5 | 0.3338 | 00 |
| 4 | 0.1381 | 010 |
| 2 | 0.1192 | 011 |
| 3 | 0.1104 | 101 |
| M | 0.1058 | 110 |

-continued

HIGH

| Symbol | Prob. | Huffman |
|---|---|---|
| 7 | 0.0793 | 111 |
| 6 | 0.0662 | 1000 |
| 1 | 0.0468 | 1001 |

The invention such as described hereabove is by no means limited to the embodiments mentioned and shown, and alternatives or improvements can be proposed on the basis thereof.

For instance, the implementation of the intra-mode MGCC coding method can be extended to a scalable-mode coding approach. The case of two layers—a basic one and an enhancement one—will be described, but the extension to several layers is also within the scope of the invention.

Figure 25:
FIGS. 25 to 28 illustrate another implementation of the invention, also called scalable-mode coding approach.
Figure 26:
Figure 27:
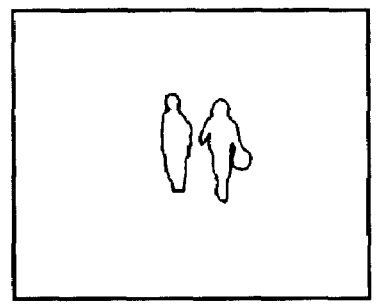
Figure 28:

Given a partition, a sub-set of its contours may be sent separately, forming a coarse representation which constitutes the basic layer. The remaining contours, constituting the enhancement layer that allows to form with the basic one the complete partition, may be sent in a posterior step. This is illustrated in FIGS. 25 to 28 where a complete partition of an image shown in FIG. 25 is presented in FIG. 26, the basic layer is shown in FIG. 27, and FIG. 28 contains the contours associated to the enhancement layer.

It must be noted that the definition of the basic layer may depend on the applications. According to said applications, different sets of contours could be selected to form respectively the two layers. In the example of FIGS. 25 to 28, the two layers have been chosen to address the separate coding of specific objects (the basic layer corresponding to the shape of the two persons). As the basic layer and the enhancement layer are coded separately, the decoding of the basic layer can also be done independently, if this coarse partition is sufficient, or in combination with the enhancement layer, if the complete partition is needed.

The coding of the basic layer is done according to the previously described method. In order to keep the coding efficiency of said basic layer as high as if it was the only information to be transmitted, no additional symbol has been included in the bitstream of the basic layer to allow the possible decoding of the enhancement layer.

For encoding said enhancement layer, some steps of the intra-mode MGCC method require changes with respect to the coding of the basic layer, especially the step of extraction of the initial points. The MGCC approach codes the basic layer addressing each cluster of regions separately. In the case of the enhancement layer, clusters of contour segments are addressed. In the intra-mode MGCC method, initial points contacting the frame are coded exploiting the fact that the frame is known at the decoding side. Further profit is taken from this concept, as, in the scalable mode, the receiver knows the complete basic layer (with the exception of the uncertainty pixels in the center of the MGCC cells). The initial points of the enhancement contour segments are directly located on known contours: these are all the contours marked as "FRAME" or "INOUT" during the basic layer coding process. Known contour elements, used as initial points, are indexed scanning the image from top to down and from left to right.

It must be noted that initial points cannot be defined as neighbour contour sites of the known contour as it is done in the intra-mode MGCC method. Unlike when coding initial points contacting the frame in said intra-mode MGCC method, two initial contour sites are possible in the case of using as reference any other known contour element. Contour points from the basic layer contacting the enhancement layer are therefore stored in a buffer of possible initial points and marked as "PENDING".

If there are no contour points contacting the basic partition, the process progresses down to the "end of partition" step and, if there is any interior region in the image, it extracts the initial contour point of the first region. Given such an initial point, the same orientation and cell type as defined at this specific location when coding the basic layer are used. The characterization of cells not containing initial points does not vary.

As previously, contour sites inside the cell that are not linked with the initial contour are withdrawn. In addition, contours belonging to the basic partition are only taken into account as initial or closing points of an enhancement contour segment. The management of multiple points and priorities in the contour tracking is not modified with respect to the case of the basic layer.

In the enhancement layer, the end of a contour segment relies on the contour elements from either the basic layer or the enhancement one previously marked as "INOUT" during the tracking step. If the output contour is that of highest priority, the end of the contour segment is reached. In addition, if the output contour is marked as "INTERNAL" (from the basic layer or the enhancement one) or "PENDING" (only from the enhancement layer), but any of the following contour sites that can be reached from it is an "INOUT" one, the contour (or the branch) is ended as well. Finally, the end of cluster and the end of partition are detected as in the intra-mode MGCC method.

The proposed intra-mode MGCC method can also be extended to an inter-mode coding approach. It is indeed known that, in order to efficiently code an image partition sequence, it is necessary to exploit the temporal redundancy existing between consecutive partitions of the sequence. The document EP 0789973 (PHF95553) describes a coding technique in which regions of the current partition are coded either in intra-mode or in inter-mode, to increase the coding efficiency. In both modes, the MGCC method can be used to further reduce the amount of coding bits. The generic inter-mode partition coding approach will therefore be first recalled, and the variations needed in order to adapt the intra-mode MGCC method will then be detailed.

A sequence of partitions is generally coded relying on the estimation of the motion between successive partitions (said estimation being based on any technique and motion model). Once the motion parameters of every region of the concerned partition have been obtained, they are used to predict the region shape in the following partition. Some regions in said new partition may need to be coded in intra-mode, because they have appeared in this partition for the first time or because it appeared as more efficient to code them in this way. These intra-regions, forming by themselves a partition, are encoded first. After their transmission, the receiver can also create with them a corresponding partition and an associated mask dividing the image into an intra-area, whose regions are already available, and an inter-area, whose regions will be motion compensated. The compensation is carried out by testing every set of motion parameters for all pixels in the inter-area: the compensation is said to be valid only if the set of parameters associated to a region $R_j$, when applied to a given pixel, compensates it into a pixel in the previous partition also belonging to the region $R_j$. If the compensated contours do not fit exactly to the original partition contours, the set of the contours that are different will be transmitted as the error of the compensated partition. Practically, contours from the original partition and contours of the intra- and inter-regions obtained after the motion compensation step are added to form a single contour image, a kind of over-partition where new regions are formed by the intersection of original inter-region contours and motion compensated contours. After some of these regions have been removed (simplifying step), contours from the original partition associated to the remaining new regions (not cancelled by the simplifying step) are transmitted jointly with their own labels.

Figure 29:
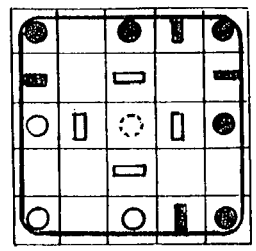
FIG. 29 shows a particular example of cell in the case of another modified implementation of the invention, called inter-mode coding approach.

The intra-mode MGCC method can be used in said inter-mode technique, in order to code the set of intra-regions as well as the additional contour segments forming the error of the compensated partition. This set of intra-regions forms a partition that can be directly coded using the intra-mode MGCC method. The only refinement that can be introduced in the decoding of said intra-regions deals with the uncertain pixels appearing in the center of some cells, which is the case of those cells associated to contours in the boundary between intra- and inter-regions. Those pixels are not directly assigned to any region in the intra-mode, but rather analyzed in the inter-mode, processed as inter-mode pixels and, according to the fact that one set of motion parameters suits them or not, respectively assigned to the associated region or to the intra-region. FIG. 29 shows an example where a cell contains pixels from intra-regions (black circles) and pixels from inter-regions (white circles): as the central pixel in the cell may belong to either an inter-region or an inter-one (its four contour sites are not yet marked), its label is not decided in the intra-mode coding, and this decision is postponed to the inter-mode decoding step.

The additional contour segments describing the compensation errors are coded relying on the previously decoded contours. It is in fact a simplified case of the scalable-mode MGCC method hereabove described. Both the transmitter and the receiver have the same information about the set of contours transmitted in intra-mode and the set of motion-compensated contours. This information can therefore play the role of the basic layer in the scalable-mode MGCC method, and the compensation error contours the role of the enhancement layer. Nevertheless, the inter-mode MGCC method is simpler than the scalable-mode one, because the intra-mode contours and the motion compensated ones are perfectly known in the encoder and in the decoder.

This way, initial contour segments can be associated to any previous contour point and not only to those marked as "INOUT" or belonging to the frame (the same policy can be followed when closing a contour).

The invention claimed is:

1. An intra-mode coding method for coding segmented pictures, or partitions, divided into homogeneous regions to which specific labels are respectively associated, wherein for each successive partition, the method comprising the steps of:
   (a) translating the picture of labels into a description in terms of a contour element chain in which the elements are defined by means of their movements through successive basic cells, between an input point and an output point of said cells;
   (b) tracking inside each successive cell each contour from its initial contour point, previously extracted, to its end by storing chain symbols corresponding both to input, internal and output contour elements of said cell and to priorities between possible multiple outputs elements, wherein the output contour point of highest priority on the basis of the longest contour path linking the input contour point with the possible output contour points is maintained;

(c) repeating these steps up to the end of each successive contour segment of the concerned partition;

(d) coding the information corresponding in each cell to the initial point of each contour segment and to the associated chain of movements between that initial point and the initial one of the following cell; said successive steps defining a so-called intra-mode coding process of image partitions;

wherein during said repeating step, multiple points symbols are introduced in the chain of symbols when a contour is ended, and the closing of a contour occurs on an input or output contour point of a previous cell or on any contour point having as a following neighbor an input or output contour point of a previous cell.

2. The coding method according to claim 1, wherein said tracking step (b) is provided for selecting the contour elements by a priority of the type "straight-right-left".

3. The coding method according to claim 1, wherein each current partition is divided into a first part of the partition, including some regions that need to be coded in intra-mode, and a second part of the partition, corresponding to the other regions to be motion compensated, said intra-mode coding process being then applied to said first part playing the role of the basic layer and an associated inter-mode coding process being correspondingly applied to said second part playing the role of the enhancement layer.

4. The coding method according to claim 3, wherein the uncertain pixels that may appear in the center of some cells are processed as inter-mode pixels.

5. A device for intra-modecoding segmented pictures, or partitions, divided into homogeneous regions to which a specific label is associated, said device comprising:
means for:

(a) translating the picture of labels into a description in terms of a contour element chain in which the elements are defined by means of their movements through successive basic cells, between an input point and an output point of said cells;

(b) tracking inside each successive cell each contour from its initial contour point, previously extracted, to its end by storing chain symbols corresponding both to input, internal and output contour elements of said cell and to priorities between possible multiple outputs elements, wherein the output contour point of highest priority on the basis of the longest contour path linking the input contour point with the possible outnut contour points is maintained;

(c) repeating these steps up to the end of each successive contour segment of the concerned partition;

(d) coding the information corresponding in each cell to the initial point of each contour segment and to the associated chain of movements between that initial point and the initial one of the following cell; said successive steps defnining a so-called intra-mode coding process of image partitions, wherein during said repeating step, multiple points symbols are introduced in the chain of symbols when a contour is ended, and the closing of a contour occurs on an input or output contour point of a previous cell or on any contour point having as a following neighbor an input or ouput contour point of a previous cell.

6. The device according to claim 5, wherein said tracking step (b) is provided for selecting the contour elements by a priority of the type "straight-right-left".

7. The device according to claim 6, wherein said tracking step includes a priority determining sub-step provided for setting, in each cell concerned by multiple outputs, the output contour point of highest priority on the basis of the longest contour path linking the input contour point with the possible output contour points, the remaining output contour points being then ordered by means of said priority of the type "straight-right-left".

8. The device according to claim 6 wherein, during said repeating step, multiple points symbols are introduced in the chain of symbols when a contour is ended, and the closing of a contour occurs on an input or output contour point of a previous cell or on any contour point having as a following neighbor an input or output contour point of a previous cell.

9. The device according to claim 8, wherein each current partition is divided into a basic layer and at least an enhancement one, said intra-mode coding process being then successively applied to the basic layer without any change and to the enhancement layer with the following modifications:

in the operation of extraction of the initial contour points, the initial points of contour segments are associated to contour points from the basic layer;

in the tracking step, all the points belonging to the basic layer are withdrawn;

in the repeating step, the closing of a contour before processing the following one is associated to contour points of the basic and enhancement layers.

10. The device according to claim 9, wherein each current partition is divided into a first part of the partition, including some regions that need to be coded in intra-mode, and a second part of the partition, corresponding to the other regions to be motion compensated, said intra-mode coding process being then applied to said first part playing the role of the basic layer and an associated inter-mode coding process being correspondingly applied to said second part playing the role of the enhancement layer.

11. The device according to claim 5, wherein said tracking step (b) is provided for selecting the contour elements by a priority of the type "straight-right-left".

12. The device according to claim 5, wherein each current partition is divided into a basic layer and at least an enhancement one, said intra-mode coding process being then successively applied to the basic layer without any change and to the enhancement layer with the following modifications:

in the operation of extraction of the initial contour points, the initial points of contour segments are associated to contour points from the basic layer;

in the tracking step, all the points belonging to the basic layer are withdrawn;

in the repeating step, the closing of a contour before processing the following one is associated to contour points of the basic and enhancement layers.

13. The device according to claim 5, wherein each current partition is divided into a first part of the partition, including some regions that need to be coded in intra-mode, and a second part of the partition, corresponding to the other regions to be motion compensated, said intra-mode coding process being then applied to said first part playing the role of the basic layer and an associated inter-mode coding process being correspondingly applied to said second part playing the role of the enhancement layer.

* * * * *